United States Patent
Blackwell et al.

(10) Patent No.: US 10,906,212 B2
(45) Date of Patent: Feb. 2, 2021

(54) ACTINIC RADIATION DEVICE FOR SPEEDY RESIN CURE

(71) Applicant: 3M INNOVATIVE PROPERTIES COMPANY, St. Paul, MN (US)

(72) Inventors: Charlie P. Blackwell, St. Paul, MN (US); Charles L. Bruzzone, Woodbury, MN (US); Michael E. Griffin, Maplewood, MN (US); Michael D. Swan, Lake Elmo, MN (US); Sheng Ye, Woodbury, MN (US); Zhisheng Yun, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 157 days.

(21) Appl. No.: 15/739,186

(22) PCT Filed: Jul. 18, 2016

(86) PCT No.: PCT/US2016/042734
§ 371 (c)(1),
(2) Date: Dec. 22, 2017

(87) PCT Pub. No.: WO2017/015188
PCT Pub. Date: Jan. 26, 2017

(65) Prior Publication Data
US 2018/0169904 A1 Jun. 21, 2018

Related U.S. Application Data

(60) Provisional application No. 62/194,476, filed on Jul. 20, 2015.

(51) Int. Cl.
*B29C 35/08* (2006.01)
*G01C 3/08* (2006.01)
*G01K 1/14* (2006.01)
*G01S 15/08* (2006.01)

(52) U.S. Cl.
CPC .......... *B29C 35/0805* (2013.01); *G01C 3/08* (2013.01); *G01K 1/143* (2013.01); *G01S 15/08* (2013.01); *B29C 2035/0822* (2013.01); *B29C 2035/0827* (2013.01); *B29C 2035/0833* (2013.01)

(58) Field of Classification Search
CPC .......... G01S 15/08; G01C 3/08; G01K 1/143; B29C 2035/0827; B29C 2035/0822; B29C 2035/0833
See application file for complete search history.

(56) References Cited

U.S. PATENT DOCUMENTS

| | | | |
|---|---|---|---|
| 4,820,365 A | 4/1989 | Brumm et al. | |
| 5,738,678 A | 4/1998 | Patel | |
| 6,077,073 A | 6/2000 | Jacob | |
| 6,207,118 B1 | 3/2001 | Gaven et al. | |
| 6,419,483 B1 | 7/2002 | Adam et al. | |
| 6,514,075 B1 | 2/2003 | Jacob | |
| 6,719,559 B2 | 4/2004 | Cao | |
| 7,221,428 B2 | 5/2007 | Pan et al. | |
| 7,967,587 B2 | 6/2011 | Bradley | |
| 8,193,514 B2 * | 6/2012 | Ferraro | F26B 3/28 250/453.11 |
| 8,899,784 B2 | 12/2014 | Meyer et al. | |
| 2003/0147032 A1 | 8/2003 | Park et al. | |
| 2004/0013815 A1 * | 1/2004 | Gros | C09D 133/062 427/558 |
| 2004/0036832 A1 * | 2/2004 | Momose | G02F 1/1339 349/153 |
| 2005/0115499 A1 | 6/2005 | Lee et al. | |
| 2006/0199144 A1 * | 9/2006 | Liu | A61C 19/004 433/29 |
| 2007/0187021 A1 | 8/2007 | Oldani et al. | |
| 2008/0026339 A1 | 1/2008 | Plank et al. | |
| 2013/0118862 A1 * | 5/2013 | Stewart | B65G 21/12 198/300 |
| 2013/0330684 A1 | 12/2013 | Dillon et al. | |

FOREIGN PATENT DOCUMENTS

| | | |
|---|---|---|
| CN | 203549743 | 4/2014 |
| JP | 2002231739 | 8/2002 |
| JP | 2009226273 | 10/2009 |
| JP | 2011005787 | 1/2011 |
| JP | 2011005789 | 1/2011 |

(Continued)

OTHER PUBLICATIONS

International Search Report for PCT International Application No. PCT/US2016/042734, dated Oct. 27, 2016, 5 pages.
Ivoclar Vivadent, "It's good to know the facts—User's Guide to the clinically relevant criteria for selecting a polymerization light", pp. 1-32, [retrieved from the internet on May 6, 2020], <https://content.pattersondental.com/items/PDFs/images/PDF_562513.pdf>.

*Primary Examiner* — Brooke Purinton
(74) *Attorney, Agent, or Firm* — Carlos M. Téllez Rodriguez; 3M Innovative Properties Company

(57) ABSTRACT

Provided are devices for applying actinic radiation to a curable resin. The devices include a housing having a front face, an actinic radiation source arranged within the housing such that actinic radiation emerges from the housing through the front face, and a proximity detector. The proximity detector is functionally connected to the actinic radiation source such that the actinic radiation source is shut off unless the proximity detector detects the presence of a surface within a safe distance from the front face. Optionally, the device includes a surface temperature sensor functionally connected to the actinic radiation source such that the actinic radiation source is shut off if the surface temperature sensor senses a surface temperature exceeding a maximum safe surface temperature.

20 Claims, No Drawings

(56) References Cited

FOREIGN PATENT DOCUMENTS

| | | |
|---|---|---|
| KR | 20060082637 | 7/2006 |
| KR | 20070051665 | 5/2007 |
| KR | 20100068113 | 6/2010 |
| KR | 20110117444 | 10/2011 |
| KR | 20110117445 | 10/2011 |
| KR | 20120035782 | 4/2012 |
| KR | 20120057227 | 6/2012 |
| KR | 20120068804 | 6/2012 |
| KR | 20140114133 | 9/2014 |
| WO | WO 00/067660 | 11/2000 |
| WO | WO 03/076158 | 9/2003 |
| WO | WO 2014/015632 | 1/2014 |
| WO | WO 2014/043488 | 3/2014 |

\* cited by examiner

ACTINIC RADIATION DEVICE FOR SPEEDY RESIN CURE

FIELD OF THE DISCLOSURE

This disclosure concerns a device adapted to provide actinic radiation for speedy cure of resins such as cure-on-demand sealants.

BACKGROUND OF THE DISCLOSURE

The following references may be relevant to the general field of technology of the present disclosure: CN 203549743U, GB 2006/24562, JP 2002/231739, JP 2009/226273, JP 2011/005787, JP 2011/005789, KR 2006/0082637, KR 2007/0051665, KR 2010/0068113, KR 2011/0117444, KR 2011/0117445, KR 2012/0035782, KR 2012/0057227, KR 2012/0068804, KR 2014/0114133, TW 588202, US 2003/0147032, US 2005/0115499, US 2013/0330684, U.S. Pat. Nos. 4,820,365, 6,077,073, 6,207,118, 6,419,483, 6,514,075, 6,719,559, 7,967,587, 8,899,784, WO 2000/67660, WO 2003/76158, WO 2014/15632.

SUMMARY OF THE DISCLOSURE

Briefly, the present disclosure provides a device for applying actinic radiation to a curable resin comprising: a) a housing having a front face; b) an actinic radiation source arranged within the housing such that actinic radiation emerges from the housing through the front face; and c) a proximity detector; where the proximity detector is functionally connected to the actinic radiation source such that the actinic radiation source is shut off unless the proximity detector detects the presence of a surface within a safe distance from the front face. Additional embodiments of the device of the present disclosure are described below under "Selected Embodiments."

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides a device adapted to provide actinic radiation for speedy cure of resins such as cure-on-demand sealants. Existing sealant products now in use in the aircraft industry are typically either two-part products or one-part products. For the two-part products, once the user mixes the two parts, the reaction begins and the sealant starts to form into an elastomeric solid. After mixing, the time that the sealant remains usable is called the application life or open time. Application life and time to cure are related in that short-application-life products cure quickly, and thus the user is forced to compromise application life for shortened cure time or accept long cure time to obtain long application life. Users may need to maintain inventories of multiple products to address the production flow requirements of different applications. For one-part products, users can avoid a complicated mixing step, but the product must be shipped and stored in a freezer and thawed before use. Cure-on-demand sealants are an attractive option to the foregoing two-part or one-part frozen sealants. In many cases, cure-on-demand sealants are radiation cured. The present disclosure provides a device adapted to provide actinic radiation for speedy cure of such cure-on-demand sealants.

SELECTED EMBODIMENTS

The following embodiments, designated by letter and number, are intended to further illustrate the present disclosure but should not be construed to unduly limit this disclosure.

D1. A device for applying actinic radiation to a curable resin comprising:
   a) a housing having a front face;
   b) an actinic radiation source arranged within the housing such that actinic radiation emerges from the housing through the front face; and
   c) a proximity detector;
wherein the proximity detector is functionally connected to the actinic radiation source such that the actinic radiation source is shut off unless the proximity detector detects the presence of a surface within a safe distance from the front face.

D2. The device according to any of the preceding embodiments which weighs less than 4.0 kg.

D3. The device according to any of the preceding embodiments which weighs less than 2.0 kg.

D4. The device according to any of the preceding embodiments which weighs less than 1.4 kg.

D5. The device according to any of the preceding embodiments which weighs less than 0.9 kg.

D6. The device according to any of embodiments D1-D5 wherein the safe distance is fixed.

D7. The device according to any of embodiments D1-D5 wherein the safe distance is adjustable.

D8. The device according to any of embodiments D1-D7 wherein the safe distance is always a distance less than 13 cm.

D9. The device according to any of embodiments D1-D7 wherein the safe distance is always a distance less than 11 cm.

D10. The device according to any of embodiments D1-D7 wherein the safe distance is always a distance less than 8 cm.

D11. The device according to any of embodiments D1-D7 wherein the safe distance is always a distance less than 5 cm.

D12. The device according to any of embodiments D1-D7 wherein the safe distance is always a distance less than 3 cm.

D13. The device according to any of preceding embodiments wherein not less than 94% of actinic radiation generated by the actinic radiation source and emerging from the device emerges through the front face.

D14. The device according to any of the preceding embodiments wherein not less than 96% of actinic radiation generated by the actinic radiation source and emerging from the device emerges through the front face.

D15. The device according to any of the preceding embodiments wherein not less than 98% of actinic radiation generated by the actinic radiation source and emerging from the device emerges through the front face.

D16. The device according to any of embodiments D1-D15 wherein the proximity detector is a laser range finder.

D17. The device according to any of embodiments D1-D15 wherein the proximity detector is a sonar range finder.

D18. The device according to any of embodiments D1-D15 wherein the proximity detector is a mechanical range finder.

D19. The device according to any of embodiments D1-D18 wherein the actinic radiation is in an infrared band.

D20. The device according to any of embodiments D1-D18 wherein the actinic radiation is in a visible band.

D21. The device according to any of embodiments D1-D18 wherein the actinic radiation is in a blue visible band.

D22. The device according to any of embodiments D1-D18 wherein the actinic radiation has a wavelength of is 450 nm+/−10 nm.

D23. The device according to any of embodiments D1-D18 wherein the actinic radiation is in a UV band.

D24. The device according to any of embodiments D1-D22 which emits no UV A radiation.

D25. The device according to any of embodiments D1-D22 or D24 which emits no UV B radiation.

D26. The device according to any of the preceding embodiments capable of applying actinic radiation at a target intensity that is greater than 3.0 W/cm$^2$ to a surface that is before the front face of the device and within the safe distance.

D27. The device according to embodiment D26 wherein the target intensity is greater than 6.0 W/cm$^2$.

D28. The device according to embodiment D26 wherein the target intensity is greater than 7.0 W/cm$^2$.

D29. The device according to embodiment D26 wherein the target intensity is greater than 7.5 W/cm$^2$.

D30. The device according to any of embodiments D1-D25 capable of applying actinic radiation at a target intensity that is greater than 3.0 W/cm$^2$ to a surface that is before the front face of the device at a distance of 3 cm.

D31. The device according to embodiment D30 wherein the target intensity is greater than 6.0 W/cm$^2$.

D32. The device according to embodiment D30 wherein the target intensity is greater than 7.0 W/cm$^2$.

D33. The device according to embodiment D30 wherein the target intensity is greater than 7.5 W/cm$^2$.

D34. The device according to any of embodiments D1-D33 wherein the actinic radiation source is one or more lasers.

D35. The device according to any of embodiments D1-D33 wherein the actinic radiation source is one or more LED's.

D36. The device according to embodiment D35 wherein the actinic radiation source is an array of at least 8 LED's.

D37. The device according to embodiment D35 wherein the actinic radiation source is an array of at least 30 LED's.

D38. The device according to embodiment D35 wherein the actinic radiation source is an array of at least 45 LED's.

D39. The device according to embodiment D35 wherein the actinic radiation source is an array of at least 80 LED's.

D40. The device according to any of the preceding embodiments additionally comprising:
 d) a surface temperature sensor;
wherein the surface temperature sensor is arranged so as to measure the temperature of a surface that is before the front face of the device and within the safe distance; and
wherein the surface temperature sensor is functionally connected to the actinic radiation source such that the actinic radiation source is shut off if the surface temperature sensor senses a surface temperature exceeding a maximum safe surface temperature.

D41. The device according to embodiment D40 wherein the maximum safe surface temperature is fixed.

D42. The device according to embodiment D40 wherein the maximum safe surface temperature is adjustable.

D43. The device according to any of embodiments D40-D42 wherein the maximum safe surface temperature is always a temperature less than 99° C.

D44. The device according to any of embodiments D40-D42 wherein the maximum safe surface temperature is always a temperature less than 94° C.

D45. The device according to any of embodiments D40-D42 wherein the maximum safe surface temperature is always a temperature less than 88° C.

D46. The device according to any of embodiments D40-D42 wherein the maximum safe surface temperature is always a temperature less than 83° C.

D47. The device according to any of embodiments D40-D42 wherein the maximum safe surface temperature is always a temperature less than 73° C.

D48. The device according to any of embodiments D40-D42 wherein the maximum safe surface temperature is always a temperature less than 63° C.

D49. The device according to any of embodiments D40-D42 wherein the maximum safe surface temperature is always a temperature less than 53° C.

D50. The device according to any of embodiments D40-D49 wherein the surface temperature detector is an infrared surface temperature detector.

D51. The device according to any of the preceding embodiments additionally comprising:
 e) a handle.

D52. The device according to embodiment D51 wherein the handle is a pistol-grip handle.

D53. The device according to embodiment D51 or D52 wherein the handle includes a hand presence sensor functionally connected to the actinic radiation source such that the actinic radiation source is shut off unless the hand presence sensor detects a hand gripping the handle of the device.

D54. The device according to embodiment D53 wherein the hand presence sensor is a capacitance device.

D55. The device according to embodiment D53 wherein the hand presence sensor is a pressure sensor.

D56. The device according to embodiment D53 wherein the hand presence sensor is a mechanical switch.

D57. The device according to any of the preceding embodiments additionally comprising:
 f) a heat sink;
wherein the heat sink is functionally connected to the actinic radiation source so as to remove heat from the actinic radiation source.

D58. The device according to embodiment D57 additionally comprising:
 g) a cooling fan;
wherein the cooling fan is arranged so as to cool the actinic radiation source, the heat sink, or both, when the cooling fan is in operation.

D59. The device according to embodiment D57 or D58 additionally comprising:
 h) an internal temperature sensor located within the housing;
wherein the internal temperature sensor is functionally connected to the actinic radiation source such that the actinic radiation source is shut off if the internal temperature sensor senses an internal temperature exceeding a maximum safe internal temperature.

D60. The device according to embodiment D58 additionally comprising:
   h) an internal temperature sensor located within the housing;
wherein the internal temperature sensor is functionally connected to the cooling fan such that the cooling fan is prevented from turning off if the internal temperature sensor senses an internal temperature exceeding a cooling-required internal temperature.

D61. The device according to embodiment D59 or D60 wherein the internal temperature sensor is in contact with the heat sink.

D62. The device according to embodiment D59 or D60 wherein the internal temperature sensor is in contact with the actinic radiation source.

D63. The device according to any of embodiments D1-D62 additionally comprising:
   i) an internal power supply.

D64. The device according to any of embodiments D1-D62 additionally comprising:
   j) an external power supply.

D65. The device according to any of the preceding embodiments additionally comprising:
   k) an operator switch;
wherein the operator switch allows or interrupts supply of power to the actinic radiation source.

D66. The device according to embodiment D65 comprising a cooling fan, wherein the operator switch additionally allows or interrupts supply of power to the cooling fan.

D67. The device according to embodiment D66 wherein the operator switch has a first position wherein both actinic radiation source and cooling fan are off, a second position wherein both actinic radiation source and cooling fan are on, and a third position wherein the actinic radiation source is off and the cooling fan is on.

D68. The device according to embodiment D67 wherein the operator switch toggles among first, second and third positions sequentially.

D69. The device according to any of the preceding embodiments additionally comprising:
   l) an illumination light source.

DM1. The actinic radiation device according to any of embodiments D1-D69 additionally comprising a microprocessor.

DM2. The actinic radiation device according to embodiment DM1 wherein the microprocessor is functionally connected to the actinic radiation source such that the actinic radiation source may be turned on or off by command from the microprocessor.

DM3. The actinic radiation device according to any of embodiments DM1-DM2 wherein the microprocessor is functionally connected to the proximity detector such that it may receive proximity-related information from the proximity detector.

DM4. The actinic radiation device according to embodiment DM3 wherein the microprocessor is programmed to shut off the actinic radiation source unless the proximity detector detects a surface within a safe distance from the front face.

DM5. The actinic radiation device according to any of embodiments DM1-DM4 wherein the device comprises a surface temperature sensor, wherein the microprocessor is functionally connected to the surface temperature sensor such that it may receive surface temperature-related information from the a surface temperature sensor.

DM6. The actinic radiation device according to embodiment DM5 wherein the microprocessor is programmed to shut off the actinic radiation source if the surface temperature sensor senses a surface temperature exceeding a maximum safe surface temperature.

DM7. The actinic radiation device according to any of embodiments DM1-DM6 wherein the device comprises a handle comprising a hand presence sensor, wherein the microprocessor is functionally connected to the hand presence sensor such that it may receive hand presence-related information from the hand presence sensor.

DM8. The actinic radiation device according to embodiment DM7 wherein the microprocessor is programmed to shut off the actinic radiation source unless the hand presence sensor detects a hand gripping the handle of the device.

DM9. The actinic radiation device according to any of embodiments DM1-DM8 wherein the device comprises a cooling fan, wherein the microprocessor is functionally connected to the cooling fan such that the cooling fan may be turned on or off by command from the microprocessor.

DM10. The actinic radiation device according to any of embodiments DM1-DM9 wherein the device comprises an internal temperature sensor, wherein the microprocessor is functionally connected to the internal temperature sensor such that it may receive internal temperature-related information from the internal temperature sensor.

DM11. The actinic radiation device according to embodiment DM10 wherein the microprocessor is programmed to shut off the actinic radiation source if the internal temperature sensor senses an internal temperature exceeding a maximum safe internal temperature.

DM12. The actinic radiation device according to embodiment DM10 wherein the device comprises a cooling fan, wherein the microprocessor is functionally connected to the cooling fan such that the cooling fan may be turned on or off by command from the microprocessor, and wherein the microprocessor is programmed to prevent the cooling fan from turning off if the internal temperature sensor senses an internal temperature exceeding a cooling-required internal temperature.

DM13. The actinic radiation device according to any of embodiments DM1-DM12 wherein the microprocessor is programmed to sample information from the proximity detector at periodic sampling times.

DM14. The actinic radiation device according to embodiment DM13 wherein the microprocessor is programmed to shut off the actinic radiation source while sampling information from the proximity detector.

DM15. The actinic radiation device according to any of embodiments DM1-DM14 wherein the microprocessor is programmed to sample information from the surface temperature sensor at periodic sampling times.

DM16. The actinic radiation device according to embodiment DM13 wherein the microprocessor is programmed to shut off the actinic radiation source while sampling information from the surface temperature sensor.

Various modifications and alterations of this disclosure will become apparent to those skilled in the art without departing from the scope and principles of this disclosure, and it should be understood that this disclosure is not to be unduly limited to the illustrative embodiments set forth hereinabove.

What is claimed is:

1. A device for applying actinic radiation to a curable resin comprising:
   a) a housing having a front face;
   b) an actinic radiation source arranged within the housing such that actinic radiation emerges from the housing through the front face; and c) a proximity detector;
wherein the proximity detector is functionally connected to the actinic radiation source such that an active actinic radiation source is shut off unless the proximity detector detects the presence of a surface within a safe distance from the front face,
wherein the device is configured to apply actinic radiation at a target intensity greater than 3 W/cm2 to a surface located 3 cm from the front face.

2. The device according to claim 1, wherein the safe distance is fixed.

3. The device according to claim 1, wherein the safe distance is adjustable.

4. The device according to claim 3, wherein the safe distance is always a distance less than 13 cm.

5. The device according to claim 3, wherein the safe distance is always a distance less than 8 cm.

6. The device according to claim 3, wherein the safe distance is always a distance less than 3 cm.

7. The device according to claim 1, wherein the proximity detector is a laser range finder.

8. The device according to claim 1, wherein the proximity detector is a sonar range finder.

9. The device according to claim 1, wherein the proximity detector is a mechanical range finder.

10. The device according to claim 1, additionally comprising:
d) a surface temperature sensor;
wherein the surface temperature sensor is arranged so as to measure the temperature of a surface that is before the front face of the device and within the safe distance; and
wherein the surface temperature sensor is functionally connected to the actinic radiation source such that the actinic radiation source is shut off if the surface temperature sensor senses a surface temperature exceeding a maximum safe surface temperature.

11. The device according to claim 10, wherein the maximum safe surface temperature is fixed.

12. The device according to claim 10, wherein the maximum safe surface temperature is adjustable.

13. The device according to claim 12, wherein the maximum safe surface temperature is always a temperature less than 99° C.

14. The device according to claim 12, wherein the maximum safe surface temperature is always a temperature less than 53° C.

15. The device according to claim 1, additionally comprising:
e) a handle,
wherein the handle includes a hand presence sensor functionally connected to the actinic radiation source such that the actinic radiation source is shut off unless the hand presence sensor detects a hand gripping the handle of the device.

16. The device according to claim 2, wherein the safe distance is a distance less than 13 cm.

17. The device according to claim 3, wherein the safe distance is a distance less than 8 cm.

18. The device according to claim 3, wherein the safe distance is a distance less than 3 cm.

19. The device according to claim 11, wherein the maximum safe surface temperature is a temperature less than 99° C.

20. The device according to claim 11, wherein the maximum safe surface temperature is a temperature less than 53° C.

* * * * *

UNITED STATES PATENT AND TRADEMARK OFFICE
CERTIFICATE OF CORRECTION

PATENT NO. : 10,906,212 B2
APPLICATION NO. : 15/739186
DATED : February 2, 2021
INVENTOR(S) : Charlie Pearman Blackwell Page 1 of 1

It is certified that error appears in the above-identified patent and that said Letters Patent is hereby corrected as shown below:

In the Claims

Column 7,
Line 8 (approx.), in Claim 1, delete "W/cm2" and insert -- $W/cm^2$ --, therefor.

Signed and Sealed this
Fourth Day of April, 2023

Katherine Kelly Vidal
*Director of the United States Patent and Trademark Office*